US012585459B2

(12) United States Patent
Ishikawa et al.

(10) Patent No.: US 12,585,459 B2
(45) Date of Patent: *Mar. 24, 2026

(54) UPDATING SYSTEM, ELECTRONIC CONTROL UNIT, UPDATING MANAGEMENT DEVICE, AND UPDATING MANAGEMENT METHOD

(71) Applicant: TOYOTA JIDOSHA KABUSHIKI KAISHA, Toyota (JP)

(72) Inventors: Tomoyasu Ishikawa, Nagoya (JP); Sho Nakamura, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,093

(22) Filed: Mar. 12, 2024

(65) Prior Publication Data

US 2024/0220234 A1     Jul. 4, 2024

Related U.S. Application Data

(63) Continuation of application No. 17/304,370, filed on Jun. 18, 2021, now Pat. No. 11,960,877, which is a
(Continued)

(30) Foreign Application Priority Data

Nov. 6, 2017     (JP) ................................ 2017-214241

(51) Int. Cl.
*G06F 8/654*          (2018.01)
*G06F 8/65*          (2018.01)
(Continued)

(52) U.S. Cl.
CPC ................ *G06F 8/654* (2018.02); *G06F 8/66* (2013.01); *G06F 11/1433* (2013.01);
(Continued)

(58) Field of Classification Search
CPC ........ G06F 8/654; G06F 8/66; G06F 11/1433; H04L 67/12; H04L 67/34; G07C 5/008
See application file for complete search history.

(56) References Cited

U.S. PATENT DOCUMENTS 9,214,085 B2     12/2015   Ichihara
9,904,531 B2      2/2018   Suzuki et al.
(Continued)

FOREIGN PATENT DOCUMENTS

JP          2004086769 A      3/2004
JP          2004126960 A      4/2004
(Continued)

OTHER PUBLICATIONS

Final Office Action, USPTO, issued to U.S. Appl. No. 16/159,117 on Aug. 4, 2020, 33 pages.
(Continued)

*Primary Examiner* — Wei Y Mui
*Assistant Examiner* — Brahim Bourzik
(74) *Attorney, Agent, or Firm* — Hunton Andrews Kurth LLP

(57)          ABSTRACT

An updating system includes a plurality of electronic control units and an updating management device. The updating management device is configured to request that the electronic control units respectively update programs and store update results of the programs transmitted from the electronic control units. The electronic control unit has a first storage region and a second storage region, and is configured to store an updated program in the second storage region and notify the updating management device of the update results according to a request from the updating management device, and is configured to start a predetermined control using the updated program stored in the second storage region when the update results stored in the updating man-
(Continued)

agement device indicate that the updating of the programs in the electronic control units is completed.

6 Claims, 13 Drawing Sheets

Related U.S. Application Data continuation of application No. 16/159,117, filed on Oct. 12, 2018, now Pat. No. 11,354,114.

(51) Int. Cl.

| | | |
|---|---|---|
| *G06F 11/14* | (2006.01) | |
| *H04L 67/00* | (2022.01) | |
| *H04L 67/12* | (2022.01) | |
| *G07C 5/00* | (2006.01) | |

(52) U.S. Cl.
CPC .............. *H04L 67/12* (2013.01); *H04L 67/34* (2013.01); *G07C 5/008* (2013.01)

(56) References Cited

U.S. PATENT DOCUMENTS

| | | | | |
|---|---|---|---|---|
| 10,157,050 | B2 | 12/2018 | Kotani et al. | |
| 2002/0099487 | A1* | 7/2002 | Suganuma | B60R 16/0232 |
| | | | | 701/1 |
| 2006/0218545 | A1 | 9/2006 | Taguchi | |
| 2006/0225069 | A1 | 10/2006 | Yuuki | |
| 2007/0185624 | A1 | 8/2007 | Duddles et al. | |
| 2011/0093843 | A1 | 4/2011 | Endo et al. | |
| 2011/0202913 | A1 | 8/2011 | Nishimura | |
| 2013/0198731 | A1 | 8/2013 | Inai | |
| 2013/0325997 | A1 | 12/2013 | Higgins et al. | |
| 2014/0075197 | A1 | 3/2014 | Alrabady et al. | |
| 2014/0237464 | A1 | 8/2014 | Waterman et al. | |
| 2014/0282470 | A1 | 9/2014 | Buga et al. | |
| 2014/0372799 | A1 | 12/2014 | Wei | |
| 2016/0098266 | A1* | 4/2016 | Martin | G06F 8/654 |
| | | | | 717/171 |
| 2016/0202966 | A1* | 7/2016 | Vangelov | G06F 8/654 |
| | | | | 717/172 |
| 2017/0090907 | A1* | 3/2017 | Kurosawa | G06F 8/65 |
| 2017/0134164 | A1 | 5/2017 | Haga et al. | |
| 2017/0192770 | A1* | 7/2017 | Ujiie | G06F 8/65 |
| 2017/0212746 | A1 | 7/2017 | Quin et al. | |
| 2018/0018160 | A1* | 1/2018 | Teraoka | G06F 9/445 |
| 2018/0341476 | A1 | 11/2018 | Kitao | |
| 2019/0031203 | A1 | 1/2019 | Fox | |
| 2019/0057214 | A1 | 2/2019 | Xia et al. | |
| 2019/0108014 | A1 | 4/2019 | Nakamura et al. | |
| 2019/0111907 | A1 | 4/2019 | Harata et al. | |
| 2019/0138296 | A1 | 5/2019 | Ishikawa et al. | |
| 2019/0324858 | A1 | 10/2019 | Sarkar et al. | |
| 2020/0112473 | A1* | 4/2020 | Deshmukh | G06F 9/5077 |
| 2020/0225930 | A1 | 7/2020 | Teraoka et al. | |
| 2021/0311724 | A1 | 10/2021 | Ishikawa et al. | |
| 2022/0063585 | A1* | 3/2022 | Tabata | B60L 58/20 |

FOREIGN PATENT DOCUMENTS

| | | |
|---|---|---|
| JP | 2011086150 A | 4/2011 |
| JP | 2011096087 A | 5/2011 |
| JP | 2011170465 A | 9/2011 |
| JP | 2012091755 A | 5/2012 |
| JP | 2017157004 A | 9/2017 |
| JP | 2018200510 A | 12/2018 |

OTHER PUBLICATIONS

Final Office Action, USPTO, issued to U.S. Appl. No. 17/304,370 on Apr. 19, 2023, 43 pages.
Non-Final Office Action, USPTO, issued to U.S. Appl. No. 16/159,117 on Feb. 3, 2020, 28 pages.
Non-Final Office Action, USPTO, issued to U.S. Appl. No. 16/159,117 on Mar. 19, 2021, 47 pages.
Non-Final Office Action, USPTO, issued to U.S. Appl. No. 17/304,370 on Aug. 17, 2023, 29 pages.
Non-Final Office Action, USPTO, issued to U.S. Appl. No. 17/304,370 on Sep. 23, 2022, 53 pages.
Notice of Allowance, USPTO, issued to U.S. Appl. No. 16/159,117 on Feb. 3, 2022, 12 pages.
Notice of Allowance, USPTO, issued to U.S. Appl. No. 17/304,370 on Dec. 13, 2023, 9 pages.

* cited by examiner

| ECU | PRESENCE OR ABSENCE OF UPDATING | UPDATE RESULT | · · · |
|---|---|---|---|
| ECU111a | ABSENCE | – | · · · |
| ECU111b | ABSENCE | – | · · · |
| ECU111c | ABSENCE | – | · · · |
| ECU112a | ABSENCE | – | · · · |
| ECU112b | ABSENCE | – | · · · |
| ⋮ | ⋮ | ⋮ | ⋮ |

| ECU | PRESENCE OR ABSENCE OF UPDATING | UPDATE RESULT | · · · |
|---|---|---|---|
| ECU111a | PRESENCE | BEING UPDATED | · · · |
| ECU111b | PRESENCE | BEING UPDATED | · · · |
| ECU111c | PRESENCE | BEING UPDATED | · · · |
| ECU112a | PRESENCE | BEING UPDATED | · · · |
| ECU112b | PRESENCE | BEING UPDATED | · · · |
| ⋮ | ⋮ | ⋮ | ⋮ |

| ECU | PRESENCE OR ABSENCE OF UPDATING | UPDATE RESULT | · · · |
|---|---|---|---|
| ECU111a | PRESENCE | COMPLETION | · · · |
| ECU111b | PRESENCE | COMPLETION | · · · |
| ECU111c | PRESENCE | BEING UPDATED | · · · |
| ECU112a | PRESENCE | BEING UPDATED | · · · |
| ECU112b | PRESENCE | COMPLETION | · · · |
| ⋮ | ⋮ | ⋮ | ⋮ |

| ECU | PRESENCE OR ABSENCE OF UPDATING | UPDATE RESULT | · · · |
|------|------|------|------|
| ECU111a | PRESENCE | COMPLETION | · · · |
| ECU111b | PRESENCE | COMPLETION | · · · |
| ECU111c | PRESENCE | COMPLETION | · · · |
| ECU112a | PRESENCE | COMPLETION | · · · |
| ECU112b | PRESENCE | COMPLETION | · · · |
| ⋮ | ⋮ | ⋮ | ⋮ |

| BEFORE UPDATING | | AFTER UPDATING | | FUNCTION RESTRICTION | . . . |
|---|---|---|---|---|---|
| START ADDRESS | VERSION | START ADDRESS | VERSION | | |
| 0xXXXX | 1.0 | – | – | – | . . . |

| BEFORE UPDATING | | AFTER UPDATING | | FUNCTION RESTRICTION | . . . |
|---|---|---|---|---|---|
| START ADDRESS | VERSION | START ADDRESS | VERSION | | |
| 0xXXXX | 1.0 | 0xYYYY | 1.2.1 | ON | . . . |

| BEFORE UPDATING | | AFTER UPDATING | | FUNCTION RESTRICTION | . . . |
|---|---|---|---|---|---|
| START ADDRESS | VERSION | START ADDRESS | VERSION | | |
| 0xXXXX | 1.0 | 0xYYYY | 1.2.1 | OFF | . . . |

| BEFORE UPDATING | | AFTER UPDATING | | FUNCTION RESTRICTION | . . . |
|---|---|---|---|---|---|
| START ADDRESS | VERSION | START ADDRESS | VERSION | | |
| 0xYYYY | 1.2.1 | 0xXXXX | 2.0 | ON | . . . |

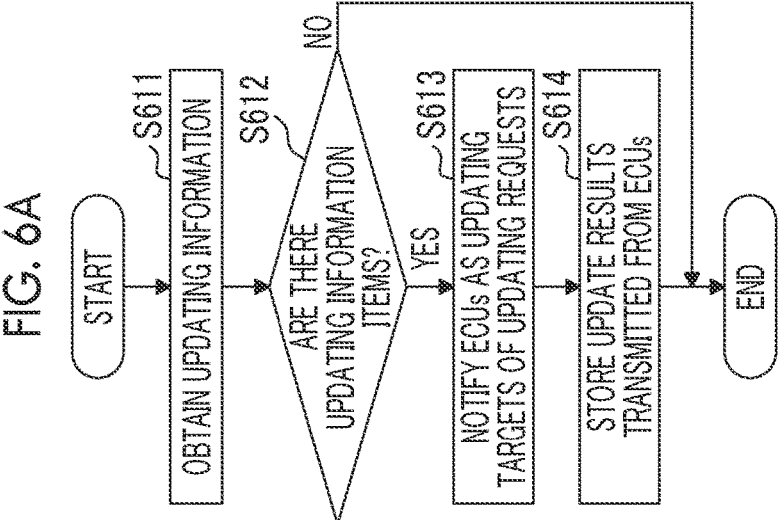

FIG. 6B

START

S621 — IG-ON

S622 — STORE UPDATE RESULTS TRANSMITTED FROM ECUs

S623 — CHECK UPDATE RESULTS OF ECUs

S624 — IS UPDATING COMPLETED?

YES → S625 — REQUEST THAT ECUs RESPECTIVELY START CONTROLS USING UPDATED PROGRAMS → END

NO → S626 — REQUEST THAT ECUs RESPECTIVELY PERFORM SWITCHING TO UN-UPDATED PROGRAMS

S627 — IS SWITCHING COMPLETED?

NO (loop back)

YES → S628 — REQUEST THAT ECUs RESPECTIVELY START CONTROLS USING UN-UPDATED PROGRAMS → END

FIG. 6A

START

S611 — OBTAIN UPDATING INFORMATION

S612 — ARE THERE UPDATING INFORMATION ITEMS?

NO (loop)

YES → S613 — NOTIFY ECUs AS UPDATING TARGETS OF UPDATING REQUESTS

S614 — STORE UPDATE RESULTS TRANSMITTED FROM ECUs

END

UPDATING SYSTEM, ELECTRONIC CONTROL UNIT, UPDATING MANAGEMENT DEVICE, AND UPDATING MANAGEMENT METHOD

INCORPORATION BY REFERENCE

This is a continuation application of U.S. patent application Ser. No. 17/304,370, filed Jun. 18, 2021, which is a continuation application of U.S. patent application Ser. No. 16/159,117, filed Oct. 12, 2018, which claims the disclosure of Japanese Patent Application No. 2017-214241 filed on Nov. 6, 2017 including the specification, drawings and abstract, all of which are incorporated herein by reference in their entirety.

BACKGROUND

1. Technical Field

The disclosure relates to an updating system, an electronic control unit, an updating management device, and an updating management method.

2. Description of Related Art

A technology that restrains version inconsistency of firmware between a plurality of computers in a computer system including the computers has been known.

For example, Japanese Unexamined Patent Application Publication No. 2011-086150 (JP 2011-086150 A) describes that two storage media of operating systems and standby systems are respectively provided in two computers in the computer system and firmware stored in the standby system of one computer is loaded into the standby system of the other computer when the computer system is powered off. When the computer system is powered on, the operating system and the standby system of the two computers are switched, and the two computers are activated by using the firmware stored in the standby systems. Thus, since the operating systems and the standby systems of the two computers are not switched until the computer system is powered on, JP 2011-086150 A discloses that it is possible to restrain the version inconsistency of the firmware between the two computers.

SUMMARY

For example, a plurality of electronic control units that respectively performs predetermined controls is mounted on a vehicle such as an automobile. For example, the electronic control units are connected to different power supply systems such as an ignition power supply, a regular power supply, and an accessory power supply, and the electronic control units are activated or reactivated in different timings. For example, in the technology disclosed in JP 2011-086150 A, it is difficult to restrain the version inconsistency when the programs executed by the electronic control units are updated in the system including the electronic control units having different activation or reactivation timings such as the vehicle.

The disclosure provides an updating system, an electronic control unit, an updating management device, and an updating management method which restrain version inconsistency of a program when programs executed by electronic control units having different activation or reactivation timings are updated.

A first aspect of the present disclosure relates to an updating system including a plurality of electronic control units configured to respectively perform predetermined controls and an updating management device configured to manage updating of programs executed by the electronic control units. The updating management device is configured to request that the electronic control units respectively update the programs and store update results of the programs transmitted from the electronic control units. The electronic control unit is configured to have a first storage region that stores an un-updated program and a second storage region that stores an updated program, is configured to store the updated program in the second storage region and notify the updating management device of the update result according to the request from the updating management device, and is configured to start the predetermined control using the updated program stored in the second storage region when the update results stored in the updating management device indicate that the updating of the programs in the electronic control units is completed.

As stated above, in the updating system according to the aspect of the present disclosure, the updating management device requests that the electronic control units as the updating targets respectively update the programs, and stores the update results transmitted from the electronic control units. Each of the electronic control units stores the updated program in the second storage region according to the request from the updating management device, and starts the control using the updated program when the updating of the programs in the electronic control units is completed. Accordingly, each of the electronic control units does not start the control using the updated program until the updating of the programs in the electronic control units is completed, and thus, it is possible to restrain the version inconsistency of the program.

A second aspect of the present disclosure relates to an electronic control unit of an updating system that updates programs executed by a plurality of electronic control units that respectively performs predetermined controls. The electronic control unit includes a processor that is configured to have a first storage region that stores an un-updated program and a second storage region that stores an updated program, store the updated program in the second storage region and notify the updating system of an update result according to a request from the updating system, and start the predetermined control using the updated program stored in the second storage region when the update results of the plurality of electronic control units managed by the updating system indicate that the updating of the programs in the plurality of electronic control units is completed.

A third aspect of the present disclosure relates to an updating management device that manages updating of programs executed by a plurality of electronic control units each having a first storage region which stores an un-updated program and a second storage region which stores an updated program. The updating management device includes a processor that is configured to request that the electronic control units respectively update the programs, store update results of the programs transmitted from the electronic control units, and notify the electronic control units of starting requests for requesting that the electronic control units respectively start predetermined controls using the updated programs when the stored update results indicate that the updating of the programs in the electronic control units is completed.

A fourth aspect of the present disclosure relates to an updating management method in an updating system that includes a plurality of electronic control units each having a first storage region which stores an un-updated program and a second storage region which stores an updated program, and an updating management device which manages updating of programs executed by the electronic control units. The updating management method includes, requesting that the electronic control units respectively update the programs by the updating management device; storing the updated program in the second storage region according to the request from the updating management device by each of the electronic control units; notifying the updating management device of an update result by each of the electronic control units; storing the update results of the programs transmitted from the electronic control units by the updating management device; and starting a predetermined control using the updated program by each of the electronic control units when the stored update results indicate that the updating of the programs in the electronic control units is completed.

According to the aspect of the present disclosure, it is possible to restrain the version inconsistency of the program in the updating system, the electronic control unit, the updating management device, and the updating management method which update the programs executed by the electronic control units having the different activation or reactivation timings.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4A is a table showing an example of an update result stored in an update result storage unit according to the first embodiment;

FIG. 4B is a table showing an example of the update result stored in the update result storage unit according to the first embodiment;

FIG. 4C is a table showing an example of the update result stored in the update result storage unit according to the first embodiment;

FIG. 4D is a table showing an example of the update result stored in the update result storage unit according to the first embodiment;

FIG. 5A is a table for describing boot information according to the first embodiment;

FIG. 5B is a table for describing the boot information according to the first embodiment;

FIG. 5C is a table for describing the boot information according to the first embodiment;

FIG. 5D is a table for describing the boot information according to the first embodiment;

FIG. 6A is a flowchart showing an example of processing in the updating management device according to the first embodiment;

FIG. 6B is a flowchart showing an example of the processing in the updating management device according to the first embodiment;

DETAILED DESCRIPTION OF EMBODIMENTS

Figure 1:
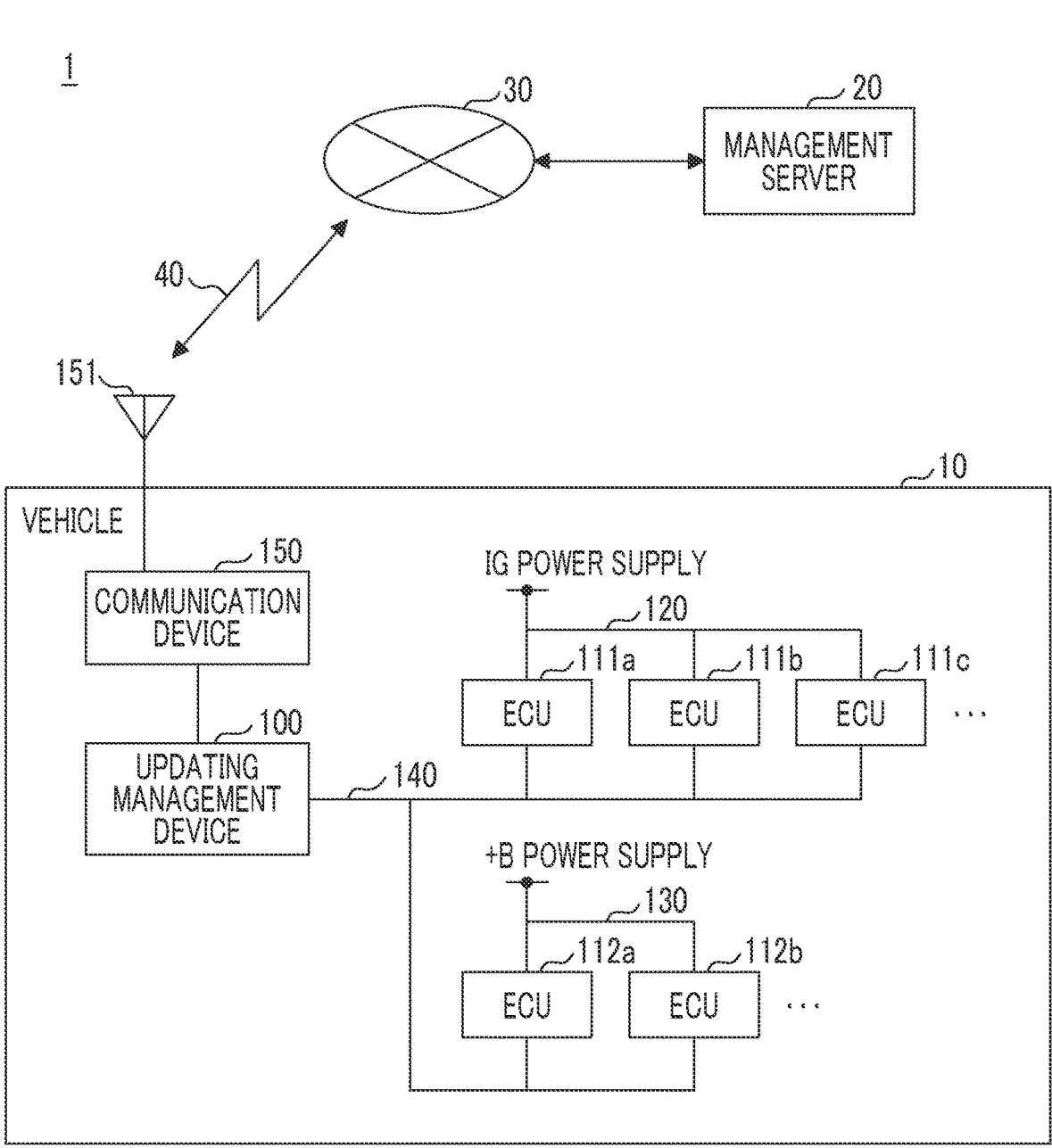
FIG. 1 is a diagram showing an example of a system configuration of an updating system according to an embodiment.

Hereinafter, mode for carrying out the disclosure will be described with reference to the drawings.
System Configurations FIG. 1 is a diagram showing an example of a system configuration of an updating system according to an embodiment. The updating system 1 includes a plurality of electronic control units (ECUs) 111a, 111b, 111c, 112a, 112b that respectively performs predetermined controls, and an updating management device 100 that manages the updating of programs in the ECUs.

In the example of FIG. 1, the ECUs and the updating management device 100 are mounted on a vehicle 10 such as an automobile, and are connected so as to communicate with each other via an in-vehicle network 140. The ECUs include the ECUs 111a, 111b, 111c, . . . which are connected with an ignition power supply (hereinafter, referred to as an IG power supply) of the vehicle 10 and the ECUs 112a, 112b, . . . which are connected with a regular power supply (+B power supply).

In the following description, any ECU of the ECUs 111a, 111b, 111c, . . . which is connected with the ignition power supply is referred to as "ECU 111". Any ECU of the ECUs 112a, 112b, . . . which is connected with the regular power supply is referred to as "ECU 112".

For example, the ECU 111 (first electronic control unit) is an ECU of a vehicle control system that controls an engine or a brake of the vehicle 10, and performs a predetermined control such as an engine control or a brake control by being activated in response to ignition-on (hereinafter, referred to as IG-ON) of the vehicle 10. For example, the ECU 111 is stopped according to ignition-off (hereinafter, referred to as IG-OFF) of the vehicle 10.

For example, the ECU 112 (second electronic control unit) is an ECU of a body system that controls keyless entry or doors, and continues the operation by using the regular power supply of the vehicle 10 even when the vehicle 10 is in the ignition-off state.

As stated above, the ECUs 111, 112 having activation or reactivation timings are different are included in the vehicle 10 (and the updating system 1). Although an ECU of a multimedia system that operates by using an accessory power supply is also included in the vehicle 10, it will be described that the ECUs 111, 112 are mounted on the vehicle 10 for the sake of convenience in description.

For example, the updating management device 100 is an electronic control unit such as multiprotocol gateways corresponding to a plurality of communication protocols. The updating management device 100 is able to communicate with the ECUs 111, 112 by using a predetermined communication protocol, and is able to communicate with a management server 20 by using a communication device 150. The communication device 150 is a device that connects the vehicle to a communication network 30 by performing wireless communication 40 by using an antenna 151 mounted on the vehicle 10 or the communication device 150, and is realized by a data communication module (DCM), for example.

In such a configuration, the updating management device 100 obtains updating information of the programs (firmware or software) in the ECUs mounted on the vehicle 10 from the management server 20 through the communication device 150. For example, identification information for identifying the ECU as an updating target or the updated program is included in the updating information.

The updating management device 100 notifies the ECUs 111, 112 as the program updating targets of updating requests for requesting that the ECUs respectively update the programs according to the updating information items obtained from the management server 20. For example, the updating request includes the updated program (or information indicating an obtaining origin of the program).

Each of the ECUs 111, 112 has a first storage region that stores an un-updated program and a second storage region that stores the updated program, and stores the updated program in the second storage region according to the updating request from the updating management device 100. Each of the ECUs 111, 112 starts processing by using the updated program when the ECUs are activated or reactivated.

Here, the ECUs 111, 112 have different power supply systems, and have different activation or reactivation timings, as described above. Thus, when the ECUs 111, 112 respectively start the predetermined controls in the respective timings, version inconsistency occurs. In this case, the normal control of the entire vehicle 10 is performed, and the movement of the vehicle 10 is likely to be adversely influenced.

The updating management device 100 stores the update results of the programs transmitted from the ECUs as the updating targets in a storage unit. For example, the updating management device 100 checks the update results stored in the storage unit at the time of the IG-ON, and requests that the ECUs respectively start the controls using the updated programs when the updating of the programs in the ECUs is completed.

Preferably, the updating management device 100 checks the update results stored in the storage unit at the time of the IG-ON, and requests that the ECUs respectively perform the switching to the controls using the un-updated programs when the updating of the programs in the ECUs is not completed.

Meanwhile, when the ECUs 111, 112 are activated or reactivated after the updated programs are stored in the second storage region, the ECUs prohibit (or postpone) the predetermined control using the updated program. When the ECUs 111, 112 are requested to start the control using the updated program from the updating management device 100, the ECUs start the control using the updated programs.

Preferably, when the ECUs 111, 112 are requested to perform the switching to the controls using the un-updated programs from the updating management device 100 after the ECUs 111, 112 are activated or reactivated by using the updated programs, the ECUs are reactivated by using the un-updated programs.

As stated above, when the updating system 1 completes the updating of the programs in all the ECUs 111, 112 as the updating targets, the ECUs 111, 112 respectively perform the predetermined controls by using the updated programs.

Therefore, in accordance with the updating system 1 according to the embodiment, it is possible to restrain the version inconsistency of the program in the updating system 1 that updates the programs executed by the ECUs 111, 112 having the different activation or reactivation timings.

In the updating system 1, when the updating of the programs in all the ECUs 111, 112 as the updating targets is not completed, the ECUs 111, 112 are reactivated by using the un-updated programs, and respectively perform the predetermined controls.

Therefore, in accordance with the updating system 1 according to the embodiment, even when the updating of the programs in all the ECUs 111, 112 as the updating targets is not completed, the ECUs 111, 112 can respectively perform the predetermined controls.

The system configuration of the updating system 1 shown in FIG. 1 is an example. For example, the ECUs 111, 112 are not limited to the ECUs mounted on the vehicle 10, and may be mounted on another information processing system including a plurality of electronic control units having different activation or reactivation timings.

The management server 20 may have the functions of the updating management device 100. For example, in FIG. 1, the vehicle 10 may have multiprotocol gateways that relay communication between the management server 20 and the ECUs instead of the updating management device 100, and the management server 20 may perform the functions of the updating management device.

Hardware Configuration

Hardware Configuration of Updating Management Device and ECUs

The updating management device 100 and the ECUs 111, 112 have the general computer configuration. For example, each of the updating management device and the ECUs includes a central processing unit (CPU) 201, a random-access memory (RAM) 202, a read-only memory (ROM) 203, a storage device 204, a communication interface (I/F) 205, an external connection I/F 206, and a system bus 207.

The CPU 201 is a calculation unit that realizes the functions of the updating management device 100 (or the ECUs 111, 112) by reading a program or data stored in the ROM 203 or the storage device 204 into the RAM 202 and performing processing. The RAM 202 is a volatile memory used as a work area of the CPU 201. The ROM 203 is a nonvolatile memory that retains the program or data even when the device is powered off. For example, the storage device 204 is a large-capacity storage device such as a flash ROM, and stores an operating system (OS), programs, and various data items.

The communication I/F 205 is a communication interface that connects the updating management device 100 (or the ECUs 111, 112) to the in-vehicle network such as Controller Area Network (CAN) and performs communication with other ECUs.

The external connection I/F 206 is an interface for connecting an external device to the updating management device 100 (or the ECUs 111, 112). For example, the external device may include a storage medium and an actuator controlled by the communication device 150, or each of ECUs 111, 112. The system bus 207 is commonly connected to the aforementioned components, and transfers address signals, data signals, and various control signals.

First Embodiment

Functional Configuration

Figure 3:
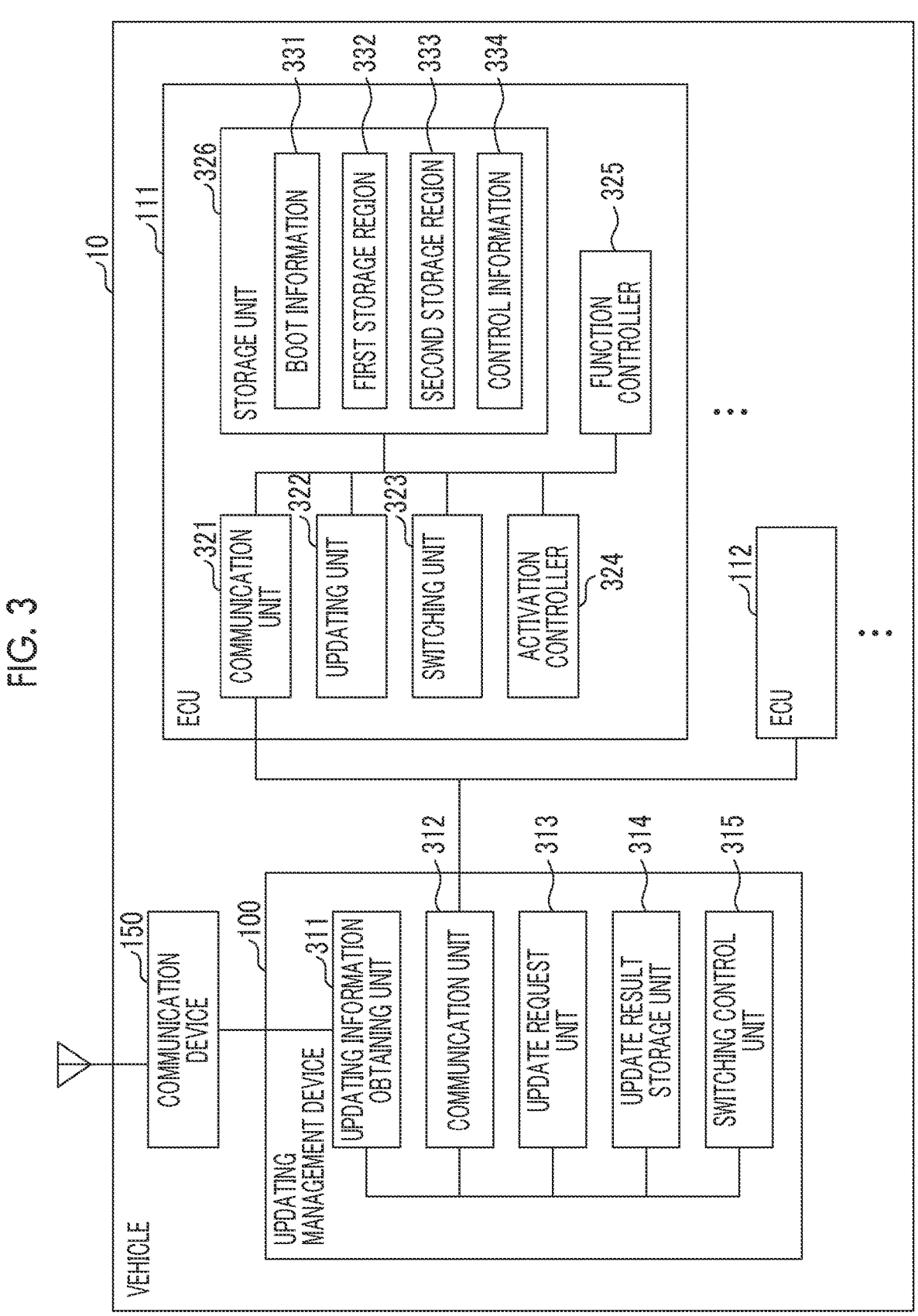
FIG. 3 is a diagram showing an example of a functional configuration of the updating management device and the ECU according to a first embodiment.

FIG. 3 is a diagram showing an example of the functional configurations of the updating management device and the ECUs according to a first embodiment. In FIG. 3, the ECU 112 has the same functional configuration as that of the ECU 111.

Functional Configuration of Updating Management Device

For example, the updating management device 100 includes an updating information obtaining unit 311, a communication unit 312, an updating request unit 313, an update result storage unit 314, and a switching controller 315.

Figure 2:
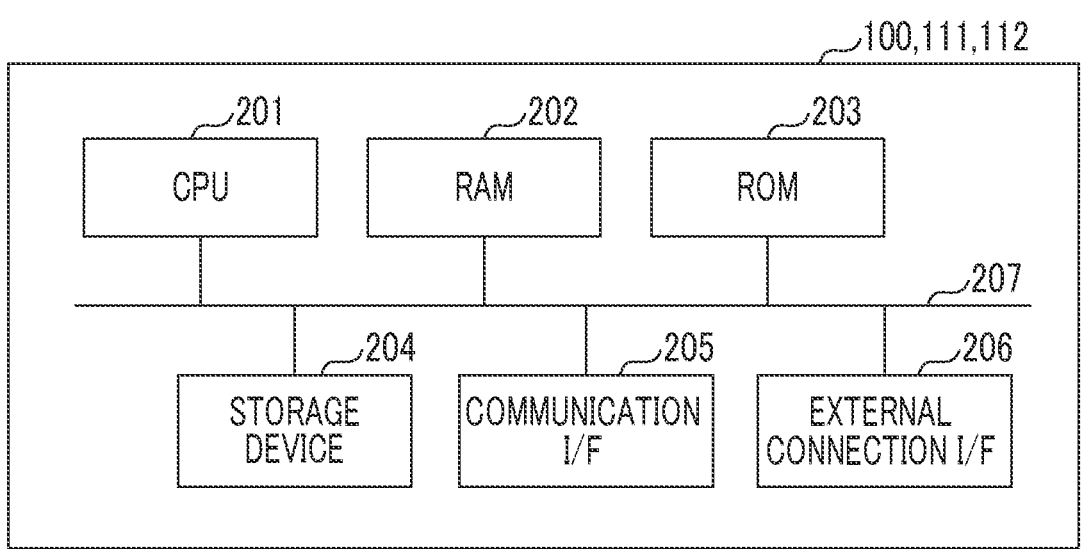
FIG. 2 is a diagram showing an example of a hardware configuration of an updating management device and an ECU according to the embodiment.

For example, the CPU 201 executes a predetermined program stored in the storage device 204 or the ROM 203 shown in FIG. 2, and thus, the updating management device 100 realizes the aforementioned functional configurations. At least a part of the functional configuration may be realized by hardware.

The updating information obtaining unit 311 obtains the updating information items of the ECUs 111, 112 as the updating targets by communicating with the management server 20 through the communication device 150. For example, the updating information obtaining unit 311 inquires of the management server 20 about whether or not there are the updating information items in the ECUs 111, 112 mounted on the vehicle 10, and obtains when there are the updating information items. Alternatively, the updating information obtaining unit 311 may obtain the updating information automatically transmitted from the management server 20, for example. For example, the updating information item obtained from the management server 20 by the updating information obtaining unit 311 includes the identification information for identifying each of the ECUs 111, 112 as the updating targets or the updated program.

For example, the communication unit 312 connects the updating management device 100 to the in-vehicle network 140 by using the communication I/F 205 of FIG. 2, and communicates with the ECUs 111, 112.

When the updating information obtaining unit 311 obtains the updating information, the updating request unit (request unit) 313 notifies the ECUs 111, 112 as the updating targets of updating request for requesting that the ECUs respectively update the programs through the communication unit 312. For example, the updating request includes the updated program, and information (for example, version information) regarding the updated program.

For example, the update result storage unit (storage unit) 314 is realized by the program executed by the CPU 201 or the storage device 204, and stores the update results transmitted from the ECUs 111, 112 as the updating targets.

FIGS. 4A to 4D are diagrams showing examples of the update results stored in the update result storage unit according to the first embodiment. For example, updating results 401 stored in the update result storage unit 314 includes information items such as "ECU", "presence or absence of updating", and "update result", as shown in FIG. 4A.

The "ECU" is information such as ECU name or identification information for identifying each of the ECUs. 111, 112.

The "presence or absence of updating" is information indicating whether or not there are the updating information items obtained by the updating information obtaining unit

311. The presence or absence of updating is set as "presence" when there are the updating information items, and is set as "absence" when there are no updating information items. For example, the updating information obtaining unit 311 checks whether or not there is the updating information, and sets "absence" in the "presence or absence of updating" corresponding to each ECU when there are no updating information items corresponding to ECUs 111a to 111c and ECUs 112a, 112b, as shown in FIG. 4A. The updating information obtaining unit 311 checks whether or not there are the updating information items, and sets "presence" in the "presence or absence of updating" corresponding to each ECU as represented in updating results 402 of FIG. 4B when there are the updating information items corresponding to the ECUs 111a to 111c and the ECUs 112a, 112b.

The "update results" are information items indicating the update results in the ECUs 111, 112 as the updating targets. The update result is set as "completion" when the updating is completed, and is set as "being updated" when the updating is not completed. For example, when the updating requests are notified to the ECUs 111, 112 as the updating targets, the updating request unit 313 sets "being updated" in the "update results" corresponding to the ECUs 111, 112 as the updating targets. When the update results indicating that the updating is completed are received from the ECUs 111, 112 as the updating targets, the update result storage unit 314 sets "completion" in the "update results" corresponding to the ECUs 111, 112 in which the updating is completed.

In the example of updating results 403 shown in FIG. 4C, the information indicating that the updating of the ECUs 111a, 111b, 112b is completed is represented. For example, when the updating of the ECUs 111a to 111c and the ECUs 112a, 112b as the updating targets is completed, the "update results" of the ECUs are set as "completion" as represented in updating results 404 of FIG. 4D. Thus, the updating management device 100 can determine that the updating of the programs in the ECUs 111a to 111c and the ECUs 112a, 112b as the updating targets is completed.

Referring back to FIG. 3, the functional configuration of the updating management device 100 will be continuously described.

For example, at the time of the IG-ON (an example of a predetermined timing), the switching controller 315 checks the update results stored in the update result storage unit 314, and determines whether or not the "update results" in the ECUs 111, 112 as the updating targets are set as "completion".

When all the "update results" of the ECUs 111, 112 as the updating targets are set as "completion", the switching controller 315 notifies the ECUs 111, 112 as the updating targets of starting requests for requesting that the ECUs respectively start the predetermined controls using the updated programs.

Meanwhile, when the "update results" of the ECUs 111, 112 as the updating targets are set as "being updated", the switching controller 315 notifies the ECUs 111, 112 as the updating targets of switching requests for requesting that the ECUs respectively perform the switching to the un-updated programs. When the switching to the un-updated programs in the ECUs 111, 112 as the updating targets is completed, the switching controller 315 notifies the ECUs 111, 112 as the updating targets of control starting requests for requesting that the ECUs respectively start the predetermined controls using the un-updated programs.

Functional Configuration of ECU

For example, the ECU 111 realizes a communication unit 321, an updating unit 322, a switching unit 323, an activation controller 324, a function controller 325, and a storage unit 326 by using the program executed by the CPU 201 shown in FIG. 2. At least a part of the functional configuration may be realized by hardware. Although the functional configuration of the ECU 111 will be described below, the ECU 112 has the same functional configuration as that of the ECU 111.

For example, the communication unit 321 connects the ECU 111 to the in-vehicle network 140 by using the communication I/F 205 of FIG. 2, and communicates with the updating management device 100.

When the updating request transmitted from the updating management device 100 is received, the updating unit 322 stores the updated program included in the updating requests in the storage unit 326.

As shown in FIG. 3, the storage unit 326 includes a first storage region 332 that stores the un-updated program, a second storage region 333 that stores the updated program, and boot information 331.

For example, when the program is not updated, the ECU 111 is activated by using the program (un-updated program) stored in the first storage region 332, and realizes the functional configuration of the ECU 111 as shown in FIG. 3. For example, when the program is updated, the updating unit 322 of the ECU 111 stores the updated program in the second storage region 333, and updates the boot information 331 so as to be activated by using the updated program at the time of the next activation.

For example, at the time of the IG-ON (an example of the predetermined timing), when the ECU is activated by using the updated program, the updating unit 322 notifies the updating management device of a completion notification indicating that the updating of the program is completed.

FIGS. 5A to 5D are diagrams for describing the boot information according to the first embodiment. FIG. 5A shows an example of boot information 331a before the ECU 111 receives the updating request from the updating management device 100. For example, the boot information includes information items such as a "start address" and a "version" before the updating, a "start address" and a "version" after the updating, and "function restriction", as shown in FIG. 5A.

The "start address" before the updating is information indicating a start address of the first storage region 332 that stores the un-updated program. The "version" before the updating is information indicating a version number of the un-updated program. The "start address" after the updating is information indicating a start address of the second storage region 333 that stores the updated program. The "version" after the updating is information indicating a version number of the updated program. The "function restriction" is information indicating whether to prohibit or permit the predetermined control using the ECU 111. The function restriction is set as "on" when the ECU determines to prohibit the predetermined control, and is set as "off" when the ECU determines to permit the predetermined control.

For example, when the updating request is received from the updating management device 100, the updating unit 322 of the ECU 111 sets "on" in the "function restriction" as represented by boot information 331b shown in FIG. 5B, and starts to store the updated program in the second storage region 333. When the storing of the updated program is completed, the updating unit 322 stores the "start address" and the "version" after the updating as represented by the boot information 331b shown in FIG. 5B.

Referring back to FIG. 3, the functional configuration of the ECU 111 will be continuously described.

At the time of the activation or reactivation of the ECU 111, the activation controller 324 activates the ECU 111 (host unit) by using the un-updated program stored in the first storage region 332 or the updated program stored in the second storage region 333 while referring to the boot information 331.

For example, when the "start address" after the updating is not stored as represented by the boot information 331a shown in FIG. 5A, the activation controller 324 activates the ECU 111 by using the "start address" before the updating and the program stored in the first storage region 332.

When the "start address" after the updating is stored as represented by the boot information 331b shown in FIG. 5B, the activation controller 324 activates the ECU 111 by using the "start address" after the updating and the updated program stored in the second storage region 333. In this case, the ECU 111 realizes the functional configuration of the ECU 111 shown in FIG. 3 by executing the updated program stored in the second storage region 333.

Preferably, the activation controller 324 is realized by Initial Program Loader (IPL) stored in the ROM 203 of FIG. 2, for example.

The switching unit 323 switches the operation of the ECU 111 according to the update results of the ECUs 111, 112 as the updating targets which are stored in the update result storage unit 314 of the updating management device 100 after the ECU 111 is activated by using the updated program.

For example, when the ECU 111 is activated by using the updated program, the "function restriction" is set as "on" as represented by the boot information 331b shown in FIG. 5B. In this case, the switching unit 323 prohibits the predetermined control (for example, the engine control or the brake control) using the ECU 111.

For example, when the update result stored in the update result storage unit 314 indicates that the updating of the ECUs as the updating targets is completed as represented by the updating results 404 shown in FIG. 4D, the updating management device 100 transmits the starting requests to the ECUs as the updating targets. In this case, the switching unit 323 of the ECU 111 sets "off" in the "function restriction" as represented by boot information 331c shown in FIG. 5C according to the starting request, and permits the predetermined control using the ECU 111.

Meanwhile, when the update result stored in the update result storage unit 314 indicates that the ECU in which there is the updating is not completed as represented by the updating results 403 shown in FIG. 4C, the updating management device 100 transmits the switching request to the ECUs as the updating targets. In this case, the switching unit 323 of the ECU 111 reactivates the ECU 111 by using the un-updated program according to the "start address" before the updating while maintaining "function restriction" set as "on" as represented by the boot information 331b shown in FIG. 5B. The switching unit 323 notifies the updating management device 100 that the ECU is reactivated by using the un-updated program, and permits the predetermined control using the un-updated program when the control starting request transmitted from the updating management device 100 is received.

The function controller 325 performs a different predetermined control (for example, the engine control or the brake control) for each ECU 111. The function controller 325 stores data such as a set value or a learning value needed in the predetermined control in control information 334 of the storage unit 326.

Flow of Processing

A flow of processing in the updating management device according to the first embodiment will be described.

Processing in Updating Management Device

FIGS. 6A and 6B are flowcharts showing examples of the processing in the updating management device according to the first embodiment.

The processing shown in FIG. 6A shows an example of the updating using the updating management device 100. For example, the aforementioned processing is performed in response to a manipulation of the user, a predetermined time interval, or an updating notification from the management server 20.

In step S611, the updating information obtaining unit 311 obtains the updating information items of the programs in the ECUs 111, 112 mounted on the vehicle 10 from the management server 20 through the communication device 150.

In step S612, the updating management device 100 divides the processing into different parts depending on whether or not there are the updating information items obtained by the updating information obtaining unit 311 (the presence or absence of updating).

For example, when the updating information obtaining unit 311 is not able to obtain the updating information, that is, when the program is not updated, the updating management device 100 ends the processing for checking the updating information. Meanwhile, when the updating information obtaining unit 311 obtains the updating information, that is, when the program is updated, the updating management device 100 proceeds the processing in step S613.

When the updating management device proceeds to the processing in step S613, the updating request unit 313 transmits (notifies) the updating request including the updated program to the ECUs 111, 112 as the updating targets.

In step S614, the update result storage unit 314 stores the update results transmitted from the ECUs 111, 112 as the updating targets.

The processing shown in step S614 is an option, and is not necessarily performed. For example, when all the ECUs 111, 112 as the updating targets is configured to notify of the update results in response to the IG-ON as shown in FIG. 6B, the processing in step S614 may be omitted.

The processing shown in FIG. 6B shows an example of the processing performed by the updating management device 100 at the time of the ignition-on (IG-ON) of the vehicle 10.

For example, when the vehicle 10 enters the IG-ON through the manipulation of the user in step S621, the updating management device 100 performs the processing subsequent to step S622.

In step S622, the update result storage unit 314 receives the update results transmitted from the ECUs 111, 112 as the updating targets for, for example, a predetermined time of period after the vehicle enters the IG-ON, and stores the received update results.

In step S623, the switching controller 315 checks the update results of the ECUs 111, 112 as the updating targets stored in the update result storage unit 314.

In step S624, the switching controller 315 divides the processing into different parts depending on whether or not the updating of the ECUs 111, 112 as the updating targets is completed. For example, when the update results of all the ECUs in which the presence or absence of updating is set as "presence" are set as "completion" as represented by the updating results 404 shown in FIG. 4D, the switching controller 315 determines that the updating is completed. Meanwhile, when the ECUs in which the presence or absence of updating is set as "presence" include the ECUs in which the update result is set as "being updated" as represented by update result 403 shown in FIG. 4C, the switching controller 315 determines that the updating is not completed.

When the updating of the ECUs 111, 112 as the updating targets is completed, the switching controller 315 proceeds to the processing in step S625. Meanwhile, when the updating is not completed, the switching controller 315 proceeds to the processing in step S626.

When the switching controller proceeds to step S625 from step S624, the switching controller 315 notifies the ECUs 111, 112 as the updating targets of the starting requests for requesting that the ECUs respectively start the controls using the updated programs.

When the switching controller proceeds to step S626 from step S624, the switching controller 315 transmits the switching requests for requesting that the ECUs respectively perform the switching to the un-updated programs to the ECUs 111, 112 as the updating targets.

In step S627, the switching controller 315 receives switching completion notifications transmitted from the ECUs 111, 112 that transmits the switching requests, and proceeds to the processing in step S628 when the switching controller determines that the switching is completed.

When the switching controller proceeds to step S628, the switching controller 315 transmits the control starting requests for requesting that the ECUs respectively start the controls using the un-updated programs to the ECUs 111, 112 as the updating targets.

Processing in ECU

Figure 7A:
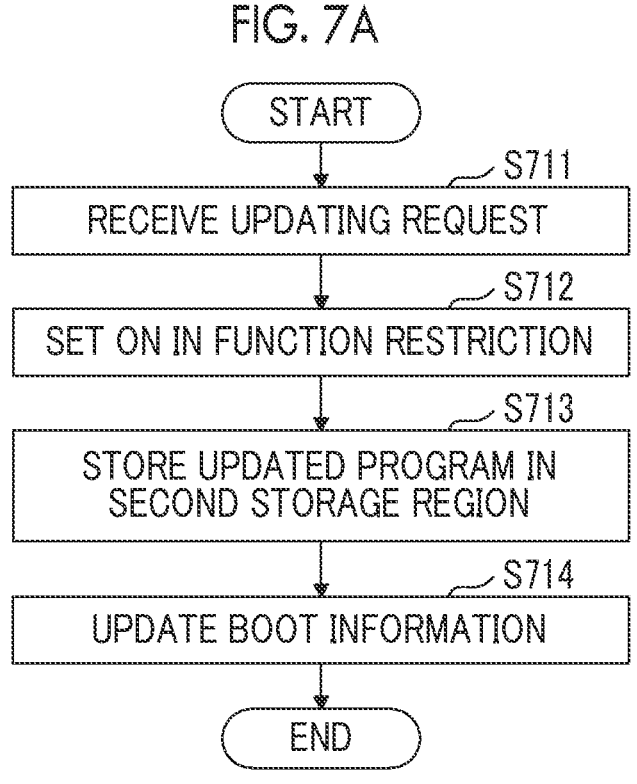
FIG. 7A is a flowchart showing an example of processing in the ECU according to the first embodiment.
Figure 7B:
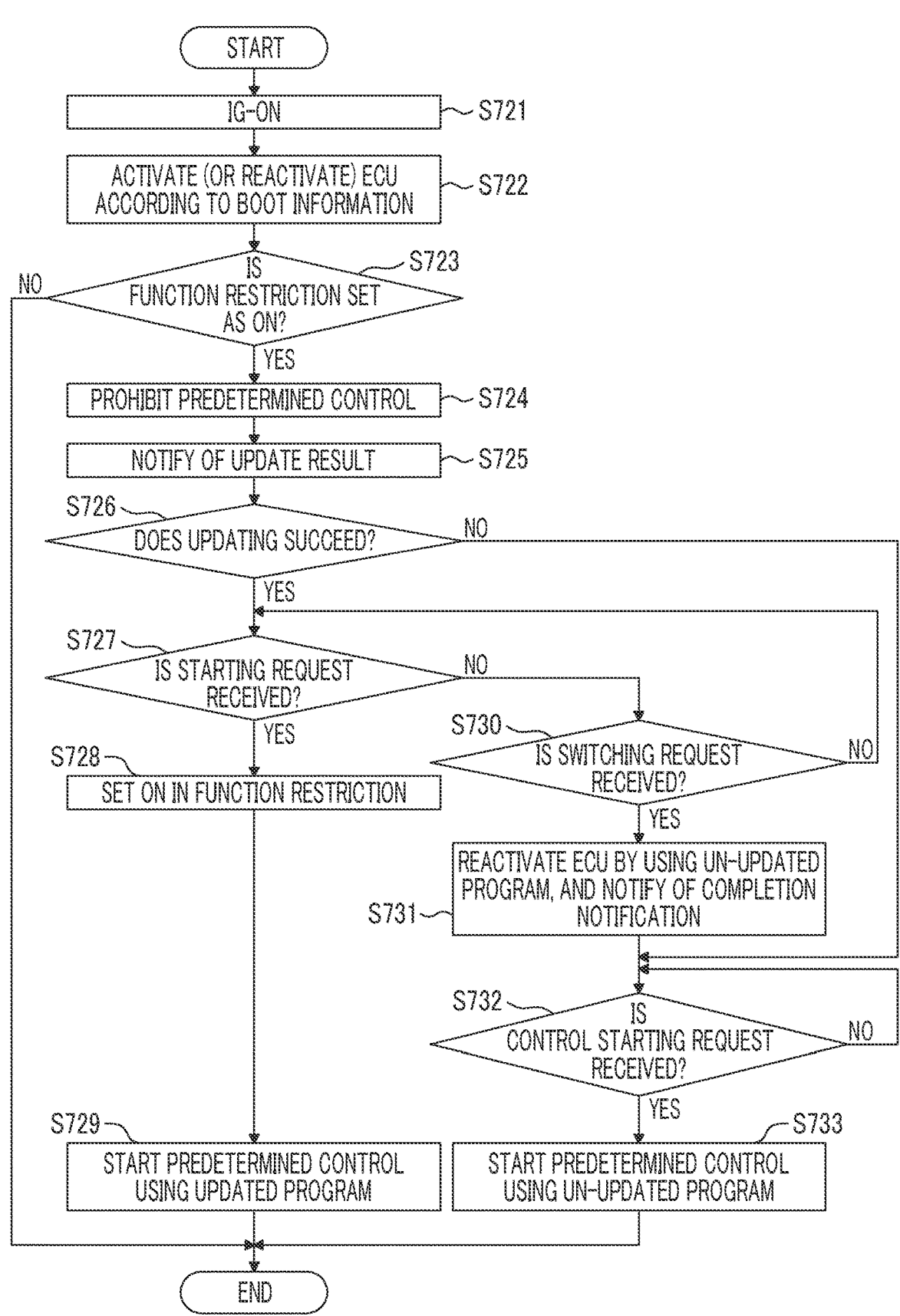
FIG. 7B is a flowchart showing an example of the processing in the ECU according to the first embodiment.

FIGS. 7A and 7B are flowcharts showing examples of processing in the ECUs according to the first embodiment. The processing shows the example of the processing in each of the ECUs 111, 112 corresponding to the processing in the updating management device 100 shown in FIGS. 6A and 6B.

FIG. 7A shows an example of the updating in each of the ECUs 111, 112 corresponding to the updating in the updating management device 100 shown in FIG. 6A.

In step S711, when the updating requests transmitted from the updating management device 100 are received, each of the ECUs 111, 112 performs the processing subsequent to step S712.

In step S712, the updating unit 322 of each of ECUs 111, 112 sets "on" in the "function restriction" of the boot information 331.

In step S713, the updating unit 322 of each of the ECUs 111, 112 stores the updated program included in the updating request received from the updating management device 100 in the second storage region 333.

In step S714, when the storing of the updated program is completed, the updating unit 322 of each of the ECUs 111, 112 updates the information items such as the "start address" and the "version" after the updating in the boot information 331.

For example, through the aforementioned processing, the "start address" and the "version" after the updating are stored in the boot information 331a in which the "start address" and the "version" after the updating are not stored as shown in FIG. 5A, as represented by the boot information 331b shown in FIG. 5B.

Meanwhile, the boot information 331c in which the "start address" and the "version" after the updating are already stored as shown in FIG. 5C is updated similarly to the boot information 331*d* shown in FIG. 5D. For example, the "start address" and the "version" after the updating stored in the boot information 331*c* are stored in the "start address" and the "version" before the updating in the boot information 331*d*. The start address and the version after the updating stored in the second storage region 333 are stored in the "start address" and the "version" after the updating in the boot information 331*d*.

FIG. 7B shows an example of the processing performed by each of the ECUs 111, 112 at the time of the IG-ON of the vehicle 10.

For example, when the vehicle 10 enters the IG-ON through the manipulation of the user in step S721, each of the ECUs 111, 112 performs the processing subsequent to step S722.

In step S722, each of the ECUs 111, 112 is activated or reactivated according to the boot information 331. For example, the ECU 111 connected to the IG power supply that supplies power at the time of the IG-ON is activated in response to the IG-ON, as shown in FIG. 1. Meanwhile, the activation controller 324 of the ECU 112 connected to the regular power supply (+B power supply) reactivates the ECU 112 in response to the IG-ON.

In this case, each of the ECUs 111, 112 selects the program used in the activation (or the reactivation) according to the "start address" before the updating and the "start address" after the updating stored in the boot information 331.

For example, when the "start address" before the updating is solely stored as represented by the boot information 331*a* shown in FIG. 5A, each of the ECUs 111, 112 selects the program used in the activation or the reactivation according to the "start address" before the updating. That is, in this case, each of the ECUs 111, 112 is activated or reactivated by using the un-updated program stored in the first storage region 332.

When the "start address" after the updating is stored as represented by the boot information items 331*b*, 331*c*, 331*d* shown in FIGS. 5B, 5C, 5D, each of the ECUs 111, 112 selects the program used in the activation or the reactivation according to the start address" after the updating. That is, in this case, each of the ECUs 111, 112 is activated or reactivated by using the updated program stored in the second storage region 333.

In step S723, the switching unit 323 divides the processing into different parts depending on whether or not the "function restriction" of the boot information 331 is set as "on".

When the "function restriction" of the boot information 331 is not set as "on", that is, when the "function restriction" is set as "off", each of the ECUs 111, 112 ends the processing at the time of the IG-ON, and performs the predetermined control using the function controller 325. Meanwhile, when the "function restriction" of the boot information 331 is set as "on", each of the ECUs 111, 112 performs the processing subsequent to step S724. The case where the "function restriction" of the boot information 331 is set as "on" means that the updating shown in FIG. 7A is performed.

In step S724, the switching unit 323 of each of the ECUs 111, 112 prohibits the predetermined control using the function controller 325. When the program of each of the ECUs 111, 112 is created in advance such that the predetermined control is not started until the starting request or the control starting request from the updating management device 100 is received, the processing in step S724 may be omitted.

In step S725, the updating unit 322 of each of the ECUs 111, 112 notifies the updating management device 100 of the update result of the updating shown in FIG. 7A.

For example, when the updating shown in FIG. 7A is normally completed, the "function restriction" is set as "on" as represented by the boot information 331*b* shown in FIG. 5B, and the "start address" and the "version" after the updating are normally stored in the boot information 331. In this case, the updating unit 322 notifies the updating management device 100 of the update result (OK) indicating that the updating is normally completed.

In step S726, the switching unit 323 of each of the ECUs 111, 112 divides the processing into different parts depending on whether or not the updating of the program succeeds through the updating shown in FIG. 7A. For example, when the updating of the program does not succeed, the switching unit 323 proceeds to the processing in step S732. Meanwhile, when the updating of the program succeeds, the switching unit 323 proceeds to the processing in step S727.

When the switching unit proceeds to step S727, the switching unit 323 of each of the ECUs 111, 112 determines whether or not the starting request for requesting that the ECU starts the predetermined control using the updated program is received from the updating management device 100. When the starting request is received, the switching unit 323 proceeds to the processing in step S728. Meanwhile, when the starting request is not received, the switching unit 323 proceeds to the processing in step S730.

When the switching unit proceeds to step S728 from step S727, the switching unit 323 of each of the ECUs 111, 112 sets "off" in the "function restriction" of the boot information 331.

In step S729, the switching unit 323 of each of the ECUs 111, 112 starts the control using the updated program. Thus, each of the ECUs 111, 112 activated or reactivated by using the updated program starts the predetermined control using the function controller 325.

When the switching unit proceeds to step S730 from step S727, the switching unit 323 of each of the ECUs 111, 112 determines whether or not the switching request for requesting that the ECU performs the switching to the un-updated program is received from the updating management device 100. When the switching request is not received, the switching unit 323 returns to the processing in step S727, and re-performs the same processing. Meanwhile, when the switching request is received, the switching unit 323 proceeds to the processing in step S731.

When the switching unit proceeds to step S731, the switching unit 323 of each of the ECUs 111, 112 reactivates each of the ECUs 111, 112 using the activation controller 324 by using the un-updated program stored in the first storage region 332. The switching unit 323 notifies the updating management device 100 of the switching completion notification indicating that the switching to the un-updated program is completed.

When the switching unit proceeds to step S732, the switching unit 323 of each of the ECUs 111, 112 waits for the control starting request transmitted from the updating management device 100, and starts the control using the un-updated program in step S733 when the control starting request is received. Thus, each of the ECUs 111, 112 activated or reactivated by using the un-updated program starts the predetermined control using the function controller 325.

A flow of the whole processing in the updating system 1 will be described with reference to FIGS. 8 and 9.

Processing 1 in Updating System

Figure 8:
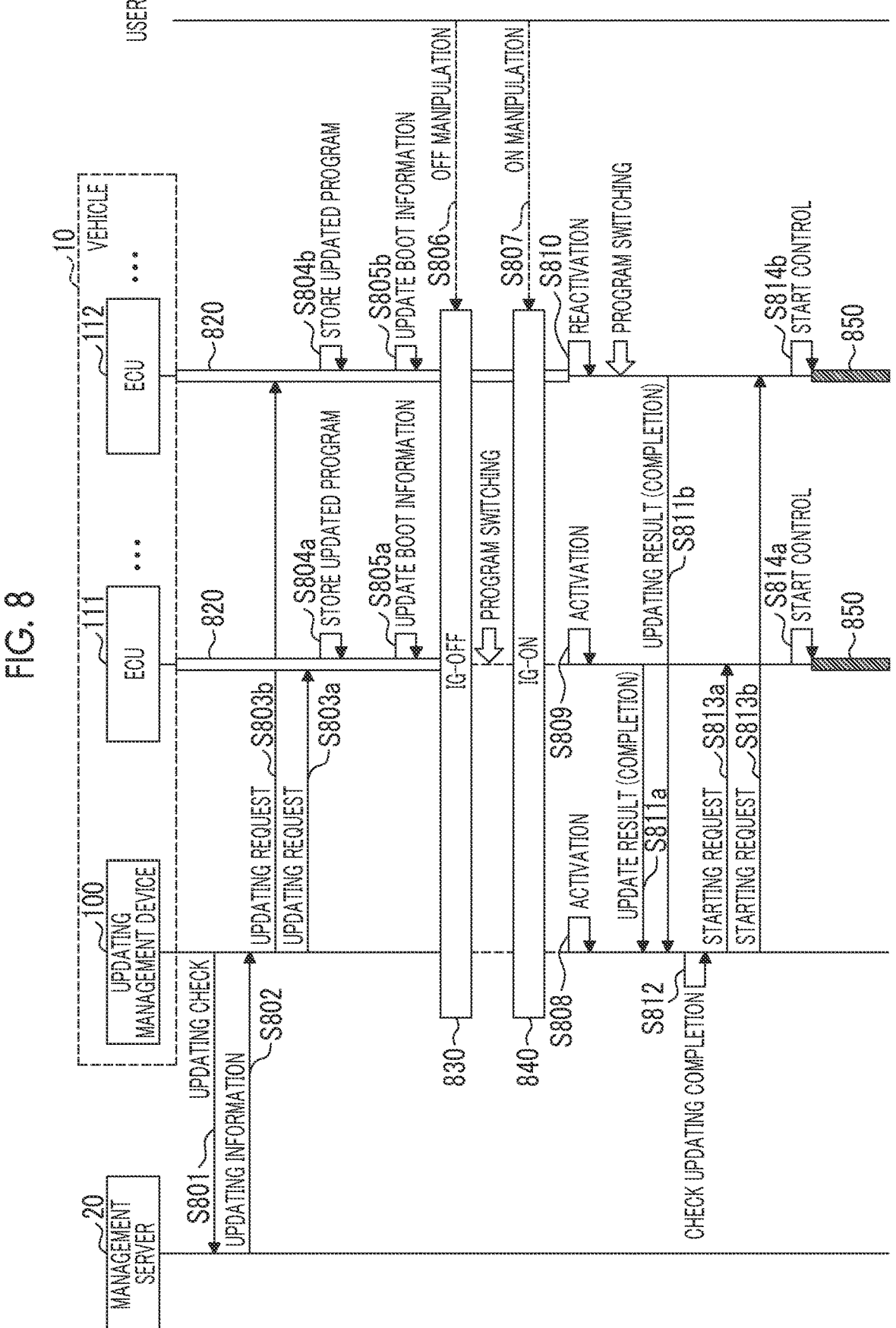
FIG. 8 is a sequence diagram showing an example of the processing in the updating system according to the first embodiment.

FIG. 8 is a sequence diagram showing an example of the processing in the updating system according to the first embodiment. The aforementioned processing shows an example of the processing when there are the updating information items of the ECUs 111, 112 and the updating of the programs of the ECUs 111, 112 is normally completed. It is assumed that each of the ECUs 111, 112 performs a predetermined control 820 using the un-updated program at a start point of time of the processing shown in FIG. 8. The processing shown in FIG. 8 corresponds to the processing shown in FIGS. 6A, 6B, 7A and 7B, and thus, the detailed description thereof will be omitted.

In steps S801, S802, the updating information obtaining unit 311 of the updating management device 100 obtains the updating information from the management server 20. The aforementioned processing corresponds to the processing in step S611 of FIG. 6A.

An example in which the updating information obtaining unit 311 obtains the updating information items of the ECUs 111, 112 will be described below.

In steps S803*a*, S803*b*, the updating request unit 313 of the updating management device 100 notifies the ECUs 111, 112 as the updating targets of the updating requests for requesting that the ECUs respectively update the programs. The aforementioned processing corresponds to the processing in step S613 of FIG. 6A.

In steps S804*a*, S804*b*, the updating unit 322 of each of the ECUs 111, 112 stores the updated program included in the updating request transmitted from the updating management device 100 in the second storage region. In steps S805*a*, 805*b*, the updating unit 322 of each of the ECUs 111, 112 updates the boot information. The aforementioned processing corresponds to the processing in steps S712 to S714 of FIG. 7A.

For example, the updating system proceeds to a state 830 in which the vehicle 10 is in the IG-OFF through the OFF manipulation of the user in step S806.

In this case, the ECU 111 connected to the ignition power supply stops the predetermined control 820 using the un-updated program, and is activated by using the updated program at the time of the next activation. That is, in the ECU 111 connected to the ignition power supply, the switching to the updated program from the un-updated program is performed.

Meanwhile, the ECU 112 connected to the regular power supply (+B power supply) continues the predetermined control 820 using the un-updated program.

For example, the updating system proceeds to a state 840 in which the vehicle 10 is in the IG-ON through the ON manipulation of the user in step S807.

For example, in step S808, the updating management device 100 is activated in response to the IG-ON, and starts the processing shown in FIG. 6B.

In step S809, the ECU 111 connected to the ignition power supply starts the processing shown in FIG. 7B, and is activated by using the updated program in response to the IG-ON.

In step S810, the ECU 112 connected to the regular power supply starts the processing shown in FIG. 7B, and is reactivated by using the updated program in response to the IG-ON. Thus, the ECU 112 connected to the regular power supply stops the predetermined control 820 using the un-updated program, and performs the program switching to the updated program from the un-updated program.

At the aforementioned point of time, each of the ECUs 111, 112 does not start a predetermined control 850 using the updated program. For example, each of the ECUs 111, 112 prohibits the predetermined control through the processing in step S724 of FIG. 7B. Alternatively, the updated program of each of the ECUs 111, 112 may be designed in advance so as to start the predetermined control according to the starting request from the updating management device 100.

In steps S811*a*, 811*b*, the updating unit 322 of each of the ECUs 111, 112 notifies the updating management device 100 of the update result (completion) indicating that the updating of the updated program is completed. The processing corresponds to the processing in step S725 of FIG. 7B.

In step S812, the switching controller 315 of the updating management device 100 checks that the updating of the updated programs is completed in the ECUs 111, 112 as the updating targets. The aforementioned processing corresponds to the processing in steps S623, S624 of FIG. 6B.

In steps S813*a*, S813*b*, the switching controller 315 of the updating management device 100 notifies the ECUs 111, 112 as the updating targets of the starting requests for requesting that the ECUs respectively start the predetermined controls using the updated programs. The aforementioned processing corresponds to the processing in step S625 of FIG. 6B.

In steps S814*a*, S814*b*, the switching unit 323 of each of the ECUs 111, 112 starts the predetermined control using the function controller 325. Thus, the ECUs 111, 112 respectively perform the predetermined controls 850 using the updated programs. The aforementioned processing corresponds to the processing in steps S727 to S729 of FIG. 7B.

Through the aforementioned processing, the updating system 1 manages the ECUs such that the predetermined control 820 using the un-updated program, which is performed by the ECU 111, and the predetermined control 850 using the updated program, which is performed by the ECU 112, are not simultaneously performed, as shown in FIG. 8. The updating system 1 manages the ECUs such that the predetermined control 850 using the updated program, which is performed by the ECU 111, and the predetermined control 820 using the un-updated program, which is performed by the ECU 112, are not simultaneously performed.

Processing 2 in Updating System

Figure 9:
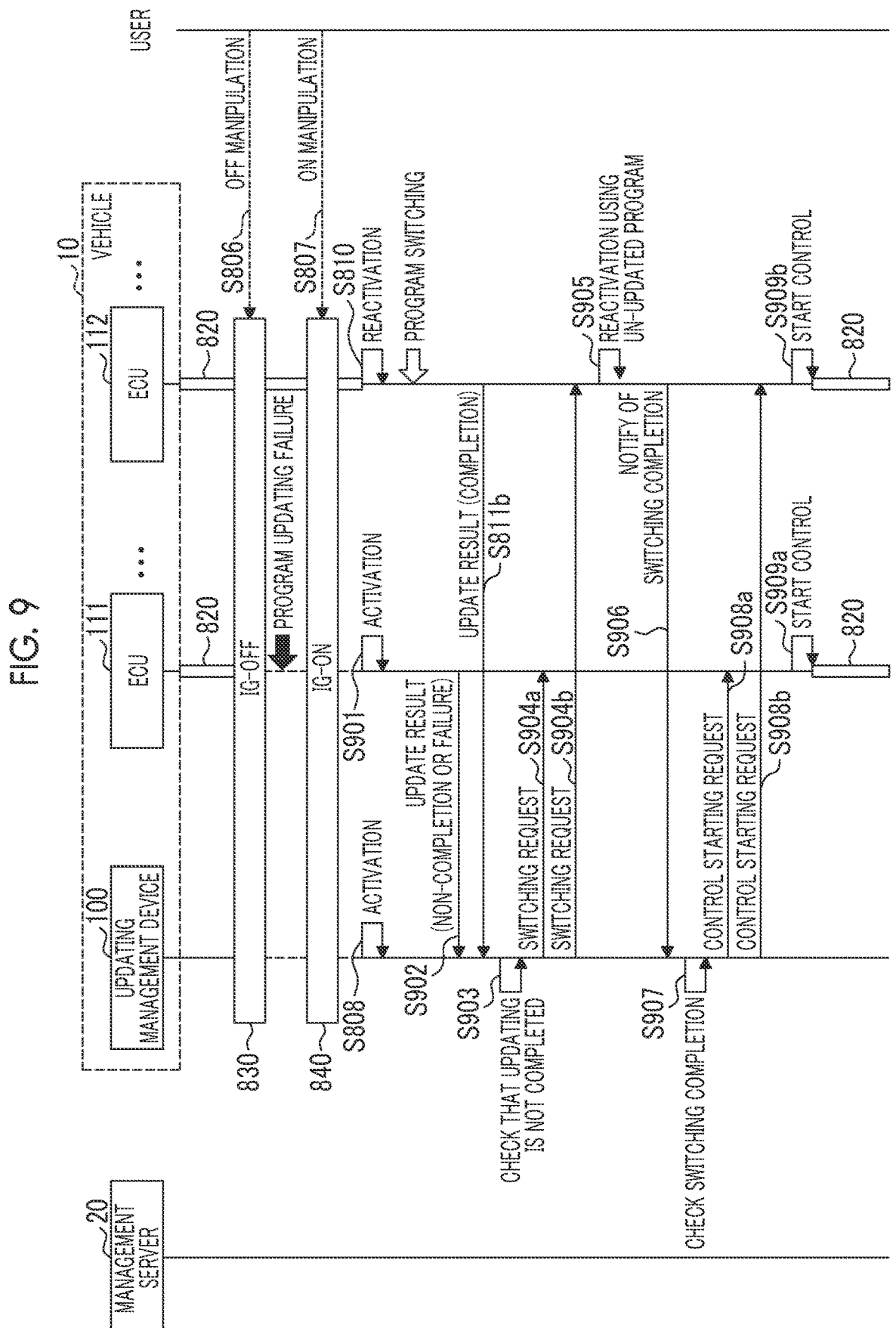
FIG. 9 is a sequence diagram showing another example of the processing in the updating system according to the first embodiment.

FIG. 9 is a sequence diagram showing another example of the processing in the updating system according to the first embodiment. The processing shows an example of the processing when there are the updating information items of the ECUs 111, 112 and the updating of the program in the ECU 111 fails.

It is assumed that the updating management device 100 and the ECUs 111, 112 perform the processing in steps S801 to S805*a* and S805*b* of FIG. 8 and the updating of the program in the ECU 111 fails through the OFF manipulation of step S806 at a start point of time of the processing of FIG. 9. It is assumed that the updating system proceeds to a state in which the vehicle 10 in the IG-OFF when the ECU 111 stores the updated program in the second storage region 333 in step S804*a* of FIG. 8 or before the ECU updates the boot information in step S805*a*.

The processing shown in steps S807, S808, S810, S811*b* of FIG. 9 are the same as the processing shown in FIG. 8, and thus, points different from those in the processing shown in FIG. 8 will be primarily described.

In step S901, since the ECU 111 connected to the ignition power supply starts the processing shown in FIG. 7B in response to the IG-ON, but the updating of the program is not completed, the ECU is activated by using the un-updated program.

In step S902, the updating unit 322 of the ECU 111 in which the updating of the program fails notifies the updating management device 100 of the update result (non-completion or failure) indicating that the updating of the program fails. The aforementioned processing corresponds to the processing in step S725 of FIG. 7B.

In step S903, the switching controller 315 of the updating management device 100 checks that the updating of the program in the ECU 111 of the ECUs 111, 112 as the updating targets is not completed. The aforementioned processing corresponds to the processing in steps S623, S624 of FIG. 6B.

In steps S904*a*, S904*b*, the switching controller 315 of the updating management device 100 notifies the ECUs 111, 112 as the updating targets of the switching requests for requesting that the ECUs respectively perform the switching to the un-updated programs. The aforementioned processing corresponds to the processing in step S626 of FIG. 6B.

The ECU 112 that is performing the updated program is reactivated by using the un-updated program in step S905, and notifies the updating management device 100 of the switching completion notification indicating that the switching of the program is completed in step S907. The aforementioned processing corresponds to the processing in step S731 of FIG. 7B.

Meanwhile, the ECU 111 that is performing the un-updated program ignores the switching request transmitted from the updating management device 100, for example. As another example, the ECU 111 may notify the updating management device 100 of the switching completion notification indicating that the ECU is performing the un-updated program.

In step S907, the switching controller 315 of the updating management device 100 checks that the switching to the un-updated program in the ECU 112 that performs the updated program is completed. For example, the aforementioned processing corresponds to the processing in step S627 of FIG. 6B.

In steps S908*a*, S908*b*, the switching controller 315 of the updating management device 100 notifies the ECUs 111, 112 of the control starting requests for requesting that the ECUs respectively start the predetermined controls using the un-updated programs. The aforementioned processing corresponds to the processing in step S628 of FIG. 6B.

In steps S909*a*, S909*b*, the switching unit 323 of each of the ECUs 111, 112 starts the predetermined control 820 using the un-updated program. The aforementioned processing corresponds to the processing in steps S732, S733 of FIG. 7B.

Through the aforementioned processing, when the ECU in which the updating is not completed is included in the ECUs as the updating targets, the updating system 1 switches back to the un-updated program, and performs the control of the vehicle 10.

According to the first embodiment, the updating system 1 that updates the programs executed by the ECUs 111, 112 having the different activation or reactivation timings can restrain the version inconsistency of the program.

Second Embodiment

It has been described in the first embodiment that the ECUs 111, 112 are activated or reactivated in the IG-OFF and IG-ON timings of the vehicle 10 and the switching to the updated program from the un-updated program is performed. However, the first embodiment is a preferred example, and the timings when the programs of the ECUs 111, 112 are updated may be timings other than the IG-ON.

In a second embodiment, an example in which the programs are updated in a predetermined timing (for example, when the updating of all the ECUs as the updating targets is completed) after the IG-ON will be described.

Configuration of ECU

Figure 10:
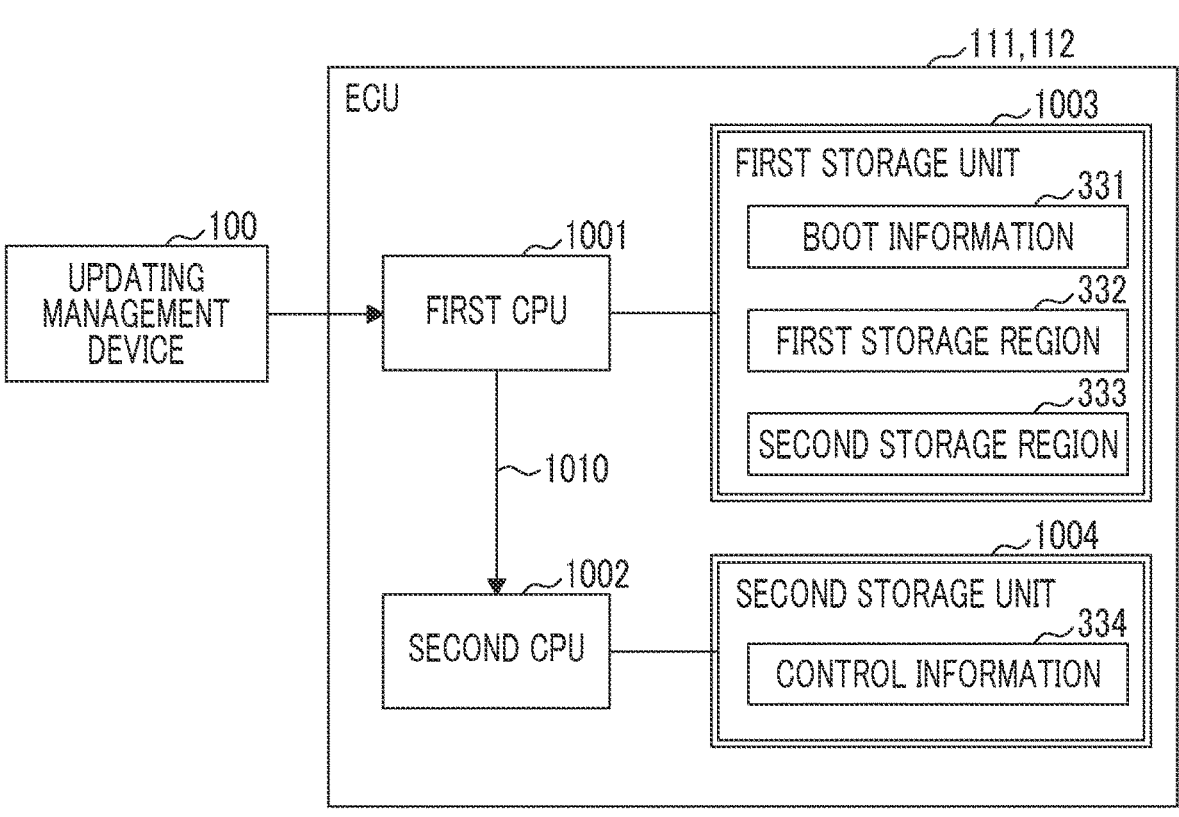
FIG. 10 is a diagram showing an image of a configuration of an ECU according to a second embodiment.

FIG. 10 is a diagram showing an image of a configuration of the ECU according to the second embodiment. For example, each of the ECUs 111, 112 according to the second embodiment includes a first CPU 1001 and a second CPU 1002, as shown in FIG. 10.

For example, the first CPU 1001 realizes the communication unit 321, the updating unit 322, and the switching unit 323 by executing a first predetermined program. For example, the second CPU 1002 realizes the activation controller 324 and the function controller 325 of FIG. 3 by executing a second predetermined program.

With the aforementioned configuration, the first CPU 1001 stores the updated program in the second storage region 333, and updates the boot information according to the notification from the updating management device 100, similarly to the first embodiment. When a switching instruction instructing an updating timing of the program is received from the updating management device 100, the first CPU 1001 resets the software of the second CPU 1002, and reactivates the host unit by using the updated program stored in the second storage region 333.

The second CPU 1002 is activated (or reactivated) by using the un-updated program stored in the first storage region, and is reactivated by using the updated program stored in the second storage region 333 according to a reactivation request from the first CPU 1001.

The functional configuration of each of the ECUs 111, 112 according to the second embodiment may be the same as the functional configuration of each of the ECUs 111, 112 according to the first embodiment shown in FIG. 3.

Flow of Processing

A flow of processing in an updating management method of the updating system 1 according to the second embodiment will be described.

Figure 11:
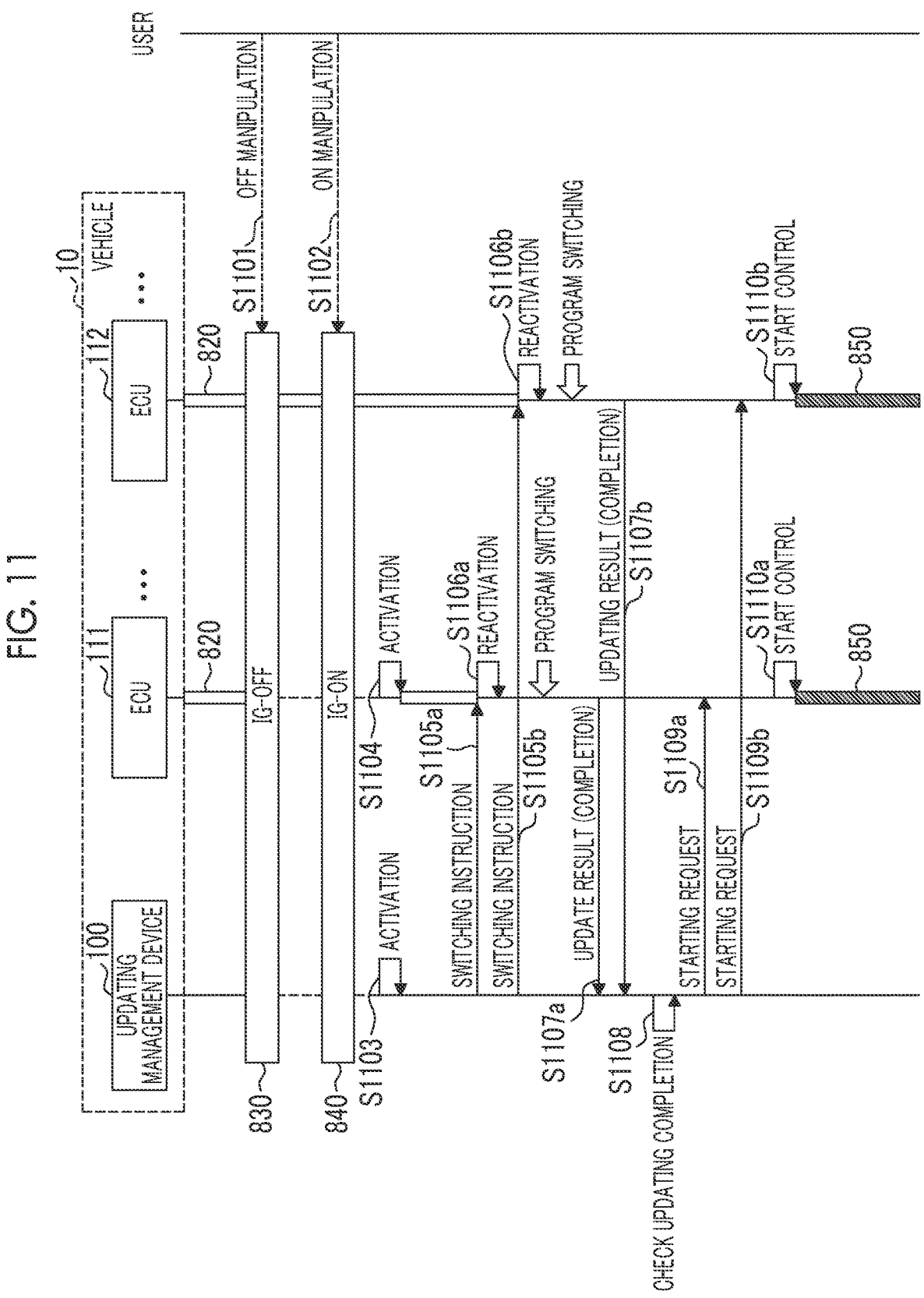
FIG. 11 is a sequence diagram showing an example of processing in an updating system according to the second embodiment.

FIG. 11 is a sequence diagram showing an example of the processing in the updating system according to the second embodiment. It is assumed that each of the ECUs 111, 112 normally completes the storing of the updated program in the second storage region 333 and the updating of the boot information 331 through the processing in steps S801 to S805*a* and S805*b* of FIG. 8 at a starting point of time of the processing shown in FIG. 11.

For example, the updating system proceeds to a state in which the vehicle 10 is in the IG-OFF through the OFF manipulation of the user in step S1101. Thus, the operation of the ECU 11 connected to the ignition power supply is stopped. Meanwhile, the second CPU 1002 of the ECU 112 connected to the regular power supply continues the predetermined control 820 using the un-updated program.

For example, the updating system proceeds to a state in which the vehicle 10 is in the IG-ON through the ON manipulation of the user in step S1102. Thus, the updating management device 100 is activated in step S1103, and the ECU 111 is activated in step S1104. In this case, the second CPU 1002 of the ECU 111 according to the second embodiment is activated by using the un-updated program and restarts the predetermined control 820 using the un-updated program.

In steps S1105*a*, S1105*b*, the updating management device 100 notifies the ECUs 111, 112 of the switching instructions for instructing that the ECUs respectively perform the switching to the updated program from the un-updated program at a predetermined timing.

As an example, the updating management device 100 notifies the ECUs 111, 112 of the switching instructions when the updating management device is activated in response to the IG-ON. Thus, it is possible to start the predetermined control 850 using the updated program in response to the IG-ON of the vehicle 10, similarly to the first embodiment.

As another example, the updating management device 100 may notify the ECUs 111, 112 of the switching instructions when the updating management device checks that the updating of the ECUs 111, 112 as the updating targets is completed through the processing in step S614 of FIG. 6A. The updating management device 100 may transmit the switching instructions to the ECUs 111, 112 in the other timing.

In steps S1106*a*, S1106*b*, the switching unit 323 realized by the first CPU 1001 of each of the ECUs 111, 112 resets the software of the second CPU 1002. The activation controller 324 realized by the second CPU 1002 of each of the ECUs 111, 112 reactivates the second CPU 1002 by using the updated program stored in the second storage region 333. Thus, the switching to the updated program from the un-updated program is performed in each of the ECUs 111, 112.

In steps S1107*a*, S1107*b*, the updating unit 322 realized by the first CPU 1001 of each of the ECUs 111, 112 notifies the updating management device 100 of the update result (completion) indicating that the updating of the program is completed.

In step S1108, the switching controller 315 of the updating management device 100 checks that the updating of the updated program is completed in each of the ECUs 111, 112 as the updating targets.

In steps S1109*a*, S1109*b*, the switching controller 315 of the updating management device 100 notifies the ECUs 111, 112 of the starting requests for requesting that the ECUs respectively start the predetermined controls using the updated programs.

In steps S1110*a*, S1110*b*, the switching unit 323 realized by the first CPU 1001 of each of the ECUs 111, 112 causes the second CPU 1002 to start the predetermined control 850 using the updated program.

Through the aforementioned processing, the updating system 1 according to the second embodiment can perform the switching to the updated program from the un-updated program in each of the ECUs 111, 112 as the updating targets in a predetermined timing different from the time of the IG-ON.

While the embodiments of the present disclosure have been described, the present disclosure is not limited to the aforementioned embodiments, and may be modified and changed in various manners without departing from the gist of the present disclosure described in the claims.

In the updating system according to the first aspect of the present disclosure, the updating management device may be configured to notify the electronic control units of starting requests for requesting that the electronic control units respectively start the predetermined controls using the updated programs when the stored update results indicate that the updating of the programs in the electronic control units is completed, and respectively start the predetermined controls using the updated programs according to the notified starting requests.

As stated above, the updating management device can cause the electronic control units to respectively start the predetermined controls using the updated programs when the updating of the programs in the electronic control units is completed.

In the updating system according to the first aspect of the present disclosure, the electronic control unit may be configured to prohibit the predetermined control using the updated program until the starting request to be transmitted from the updating management device is received.

As described above, the updating management device can more reliably restrain the electronic control unit that completes the updating of the program from starting the predetermined control using the updated program before the updating of the programs in the electronic control units is completed.

In the updating system according to the first aspect of the present disclosure, the updating management device may be configured to notify the electronic control units of switching requests for requesting that the electronic control units respectively perform the predetermined controls using the un-updated programs when the update results stored in the updating management device indicate that there is the electronic control unit in which the updating of the program is not completed. The electronic control unit may be configured to perform the predetermined control by using the un-updated program stored in the first storage region when the switching request is received from the updating management device.

As stated above, the updating management device can cause the electronic control units to respectively perform the predetermined controls by using the un-updated programs when the electronic control unit in which the updating of the program is not completed is included in the electronic control units.

In the updating system according to the first aspect of the present disclosure, the electronic control unit may be configured to reactivate the electronic control unit by using the un-updated program stored in the first storage region when the switching request is received from the updating management device after the electronic control unit is reactivated by using the updated program.

As mentioned above, the electronic control unit can perform the predetermined control by using the un-updated program when the switching request is received from the updating management device even after the electronic control unit is activated by using the updated program.

In the updating system according to the first aspect of the present disclosure, the electronic control units may include a first electronic control unit that is mounted on a vehicle and is connected to an ignition power supply of the vehicle and a second electronic control unit that is mounted on the vehicle and is connected to a regular power supply of the vehicle.

As stated above, the updating system can restrain the version inconsistency of the program when the programs of the electronic control units are updated in the vehicle including the electronic control units having the different activation or reactivation timings.

In the updating system according to the first aspect of the present disclosure, the second electronic control unit may be configured to reactivate the second electronic control unit by using the updated program in response to ignition-on of the vehicle after the updated program is stored in the second storage region.

As mentioned above, it is possible to switch the program of the second electronic control unit connected to the regular power supply from the updated program from the un-updated program at the time of the ignition-on.

In the updating system according to the first aspect of the present disclosure, the first electronic control unit and the second electronic control unit may be configured to respectively reactivate the first electronic control unit and the second electronic control unit by using the updated programs according to switching instructions transmitted from the updating management device after the updated programs are stored in the respective second storage regions.

As stated above, the updating system can switch the programs causing the electronic control units to respectively perform the predetermined controls from the un-updated programs to the updated programs even in a timing different from the time of the ignition-on.

What is claimed is:

1. A control device mounted on a vehicle, comprising:
one or more processors; and
one or more memories, wherein
the one or more processors are configured to read and execute a program stored in the one or more memories to realize the following operations:
instructing updating programs for each of a first electronic control unit and a second electronic control unit mounted in the vehicle,
the first electronic control unit configured to:
stop a first un-updated program in response to turning-off of the vehicle,
start an operation with a first updated program in response to turning-on of the vehicle, and
switch a program to be executed by the first electronic control unit from the first updated program to the first un-updated program in response to a predetermined request from the one or more processors,
the second electronic control unit configured to:
maintain a control by a second un-updated program even when the vehicle is turned off,
switch a program to be executed by the second ECU from the second un-updated program to a second updated program in response to the turning-on of the vehicle, and
switch the program to be executed by the second ECU from the second updated program to the second un-updated program in response to the predetermined request from the update management device, and
determining whether at least one of electronic control units fail to update the program by confirming success or failure of updating the programs of the first electronic control unit and success or failure of updating the programs of the second electronic control unit, and
sending, to the electronic control units, a predetermined request to cause the electronic control units to switch the programs executed by the first electronic control unit from the program after a first update to the program before the first update and to switch the programs executed by the second electronic control unit from the program after a second update to the program before the second update, on a condition that the electronic control unit determines that at least one of the electronic control units fails to update the program based on the determination performed in response to turning-on of the vehicle,
wherein the first electronic control unit is configured to stop the program before updating in response to turning-off of the vehicle, and wherein the second electronic control unit is configured to maintain execution of the program before updating even after turning-off of the vehicle.

2. The control device according to claim 1, wherein the operations further include sending, to the electronic control units, a starting request to cause the electronic control units to start execution of the programs after updating, on a condition that the electronic control units succeed in updating the program.

3. The control device according to claim 1, wherein the electronic control units are configured to restart the electronic control units and execute the program before updating, in response to receiving the predetermined request.

4. The vehicle comprising the control device according to claim 1.

5. A method for controlling operations of a vehicle comprising the steps of:
instructing updating programs, using one or more processors, for each of a first electronic control unit and a second electronic control unit mounted in the vehicle,
the first electronic control unit configured to:
stop a first un-updated program in response to turning-off of the vehicle,
start an operation with a first updated program in response to turning-on of the vehicle, and
switch a program to be executed by the first electronic control unit from the first updated program to the first un-updated program in response to a predetermined request from the one or more processors,
the second electronic control unit configured to:
maintain a control by a second un-updated program even when the vehicle is turned off,
switch a program to be executed by the second ECU from the second un-updated program to a second updated program in response to the turning-on of the vehicle, and
switch the program to be executed by the second ECU from the second updated program to the second un-updated program in response to the predetermined request from the update management device, and
determining, using the one or more processors, whether at least one of electronic control units fail to update the program by confirming success or failure of updating the programs of the first electronic control unit and success or failure of updating the programs of the second electronic control unit, and
sending, using the one or more processors, to the electronic control units, a predetermined request to cause the electronic control units to switch the programs executed by the first electronic control unit from the program after the first update to the program before the first update and to switch the programs executed by the second electronic control unit from the program after the second update to the program before the second update, on a condition that the electronic control unit determines that at least one of the electronic control units fails to update the program based on the determination performed in response to turning-on of the vehicle,
stopping the program before updating in response to turning-off of the vehicle with the first electronic control unit, and
maintaining execution of the program before updating even after turning-off of the vehicle with the second electronic control unit.

6. A non-transitory storage medium storing the program causing a vehicle to execute a method comprising the steps of:

instructing updating programs, using one or more processors, for each of a first electronic control unit and a second electronic control unit mounted in the vehicle, the first electronic control unit configured to:

stop a first un-updated program in response to turning-off of the vehicle, start an operation with a first updated program in response to turning-on of the vehicle, and switch a program to be executed by the first electronic control unit from the first updated program to the first un-updated program in response to a predetermined request from the one or more processors, the second electronic control unit configured to:

maintain a control by a second un-updated program even when the vehicle is turned off, switch a program to be executed by the second ECU from the second un-updated program to a second updated program in response to the turning-on of the vehicle, and switch the program to be executed by the second ECU from the second updated program to the second un-updated program in response to the predetermined request from the update management device, and determining, using the one or more processors, whether at least one of the electronic control units fails to update the program by confirming success or failure of updating the programs of the first electronic control unit and success or failure of updating the programs of the second electronic control unit, and sending, using the one or more processors, to the electronic control units, a predetermined request to cause the electronic control units to switch the programs executed by the first electronic control unit from the program after the first update to the program before the first update and to switch the programs executed by the second electronic control unit from the program after the second update to the program before the second update, on a condition that the electronic control unit determines that at least one of the electronic control units fails to update the program based on the determination performed in response to turning-on of the vehicle, stopping the program before updating in response to turning-off of the vehicle with the first electronic control unit, and maintaining execution of the program before updating even after turning-off of the vehicle with the second electronic control unit.

* * * * *